(12) United States Patent
Clark et al.

(10) Patent No.: US 12,314,050 B1
(45) Date of Patent: May 27, 2025

(54) SYSTEM AND METHOD FOR MAINTAINING SONAR IMAGING OF A STRUCTURE REGARDLESS OF BOAT ORIENTATION

(71) Applicants: Taylor Clark, Dahlonega, GA (US); Will Bates, Milton, GA (US); Patrick Snellings, Cummings, GA (US); Justin Freeman, Ball Ground, GA (US)

(72) Inventors: Taylor Clark, Dahlonega, GA (US); Will Bates, Milton, GA (US); Patrick Snellings, Cummings, GA (US); Justin Freeman, Ball Ground, GA (US)

(73) Assignee: Johnson Outdoors Inc., Racine, WI (US)

( * ) Notice: Subject to any disclaimer, the term of this patent is extended or adjusted under 35 U.S.C. 154(b) by 896 days.

(21) Appl. No.: 17/217,319

(22) Filed: Mar. 30, 2021

Related U.S. Application Data

(60) Provisional application No. 63/001,858, filed on Mar. 30, 2020.

(51) Int. Cl.
*B63B 79/00* (2020.01)
*A01K 97/12* (2006.01)
(Continued)

(52) U.S. Cl.
CPC ......... *G05D 1/0094* (2013.01); *A01K 97/125* (2013.01); *B63B 79/00* (2020.01);
(Continued)

(58) Field of Classification Search
CPC .... G05D 1/0094; B63B 79/00; A01K 97/125; B63H 20/007; B63H 20/12; G01S 19/40
See application file for complete search history.

(56) References Cited

U.S. PATENT DOCUMENTS

| 4,692,722 A | 9/1987 | Reichel et al. |
| 5,013,979 A | 5/1991 | Birleson |

(Continued)

FOREIGN PATENT DOCUMENTS

CN  107140116 A  * 9/2017

OTHER PUBLICATIONS

Navico Holding AS; Lowrance SpotlightScan Operation Manual; 2014, publicly available prior to Mar. 30, 2020; 12 pages; Lowrance.com.

(Continued)

*Primary Examiner* — Isam A Alsomiri
*Assistant Examiner* — Abdallah Abulaban
(74) *Attorney, Agent, or Firm* — Reinhart Boerner Van Deuren P.C.

(57) ABSTRACT

A sonar target locking system to position a sonar assembly to maintain the sonar array of the sonar assembly pointing at a position of a user-set (desired) target even when the watercraft is rotating or moving in various motions. The sonar target locking system includes electro-mechanical assembly that can be steered electrically to maintain the sonar array pointing at the position of the desired target. The system may be activated using at least one of a foot pedal, handheld remote control, or a display of a fish finder head unit. The system may use GPS and IMU inputs to generate control signals to steer the electro-mechanical assembly to maintain the sonar array pointing at the position of the desired target.

24 Claims, 8 Drawing Sheets

(51) Int. Cl.
  *B63H 20/00*  (2006.01)
  *B63H 20/12*  (2006.01)
  *G01S 19/40*  (2010.01)
  *G05D 1/00*  (2006.01)

(52) U.S. Cl.
  CPC ........... *B63H 20/007* (2013.01); *B63H 20/12* (2013.01); *G01S 19/40* (2013.01)

(56) References Cited

U.S. PATENT DOCUMENTS

| | | | |
|---|---|---|---|
| 5,182,732 | A | 1/1993 | Pichowkin |
| 5,525,081 | A | 6/1996 | Mardesich et al. |
| 5,923,617 | A | 7/1999 | Thompson et al. |
| 6,254,441 | B1 | 7/2001 | Knight et al. |
| 6,292,433 | B1 | 9/2001 | Gilbert et al. |
| 6,661,739 | B1 | 12/2003 | Benjamin et al. |
| 6,678,210 | B2 | 1/2004 | Rowe |
| 6,870,794 | B2 | 3/2005 | Healey |
| 7,606,114 | B2 | 10/2009 | Bachelor et al. |
| 7,889,600 | B2 | 2/2011 | Thompson et al. |
| 8,390,300 | B2 | 3/2013 | Ems et al. |
| 8,463,458 | B2 | 6/2013 | Wood et al. |
| 8,593,903 | B2 | 11/2013 | Pocwiardowski |
| 8,606,432 | B1 | 12/2013 | Wood et al. |
| 8,638,362 | B1 | 1/2014 | Thompson et al. |
| 8,811,120 | B2 | 8/2014 | Bachelor et al. |
| RE45,379 | E | 2/2015 | Rowe |
| 8,964,507 | B2 | 2/2015 | Bachelor et al. |
| 9,664,783 | B2 | 5/2017 | Brown et al. |
| 9,766,328 | B2 | 9/2017 | Black et al. |
| 9,784,825 | B2 | 10/2017 | Brown et al. |
| 9,784,826 | B2 | 10/2017 | Matson et al. |
| 9,812,118 | B2 | 11/2017 | Matson et al. |
| 10,310,062 | B2 | 6/2019 | Coleman et al. |
| 10,338,195 | B2 | 7/2019 | Stokes et al. |
| 10,416,307 | B2 | 9/2019 | Stokes et al. |
| 10,454,398 | B2 | 10/2019 | Hanseler et al. |
| 10,545,226 | B2 | 1/2020 | Wigh et al. |
| 10,597,130 | B2 | 3/2020 | Antao et al. |
| 10,719,077 | B2 | 7/2020 | Clark et al. |
| 10,852,429 | B2 | 12/2020 | Gatland |
| 10,890,660 | B2 | 1/2021 | Wigh et al. |
| 11,173,996 | B2 | 11/2021 | Salmon et al. |
| 2003/0223310 | A1 | 12/2003 | Benjamin et al. |
| 2006/0050615 | A1 | 3/2006 | Swisher |
| 2009/0037040 | A1 | 2/2009 | Salmon et al. |
| 2010/0014386 | A1* | 1/2010 | Thompson .............. G01S 15/89 367/103 |
| 2014/0269191 | A1 | 9/2014 | Iverson et al. |
| 2014/0321242 | A1 | 10/2014 | Acker et al. |
| 2016/0259055 | A1* | 9/2016 | Betts .................... G01S 7/6236 |
| 2017/0212230 | A1 | 7/2017 | Wigh et al. |
| 2018/0100922 | A1 | 4/2018 | Wigh et al. |
| 2018/0217244 | A1 | 8/2018 | Coleman et al. |
| 2019/0064348 | A1* | 2/2019 | Clark ..................... G01S 15/96 |
| 2019/0072951 | A1 | 3/2019 | Clark et al. |
| 2019/0179318 | A1* | 6/2019 | Miller ................... B63H 25/42 |
| 2019/0242994 | A1 | 8/2019 | Wanis et al. |
| 2019/0331779 | A1 | 10/2019 | Sandretto |
| 2020/0049507 | A1 | 2/2020 | Clark et al. |
| 2020/0072953 | A1 | 3/2020 | Wigh et al. |
| 2020/0103512 | A1 | 4/2020 | Brown et al. |
| 2020/0158842 | A1 | 5/2020 | Wigh et al. |
| 2020/0256967 | A1 | 8/2020 | Wigh et al. |
| 2020/0292701 | A1 | 9/2020 | Darrow |
| 2020/0341463 | A1 | 10/2020 | Clark et al. |
| 2021/0015068 | A1 | 1/2021 | Stoll |
| 2021/0096244 | A1 | 4/2021 | Wigh et al. |
| 2021/0263150 | A1 | 8/2021 | Stokes |

OTHER PUBLICATIONS

Kenneth G. Foote et al.; Protocols for calibrating multibeam sonar; University of New Hampshire Scholars Repository; https://scholars.unh.edu/ccom; Apr. 2005; 17 pages.

Kevin L. Haskins et al.; Interaction between Brash Ice and Boat Propulsion Systems; U.S. Army Corps of Engineers ERDC; https://apps.dtic.mil/sti/citations/ADA596756; Feb. 2014; 95 pages.

* cited by examiner

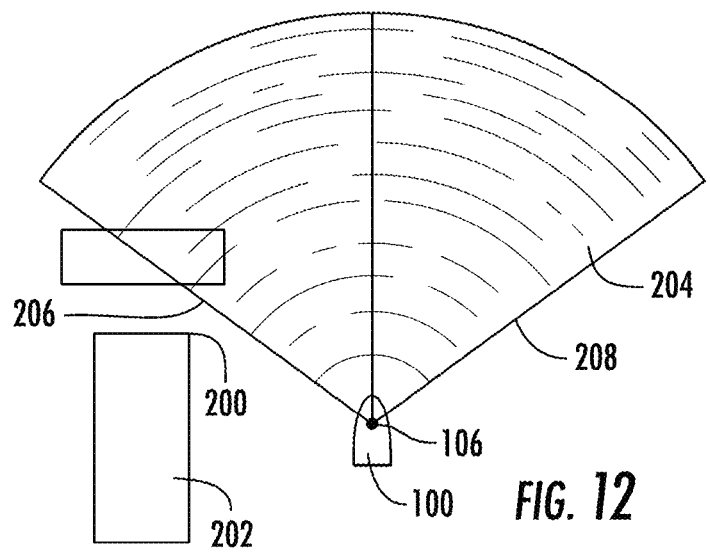
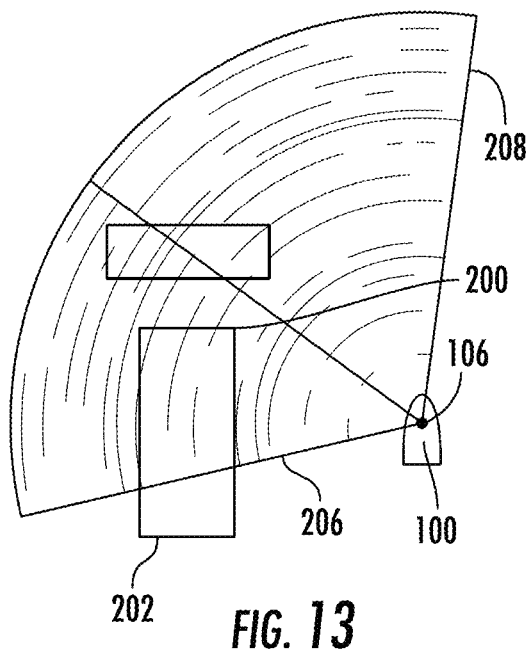
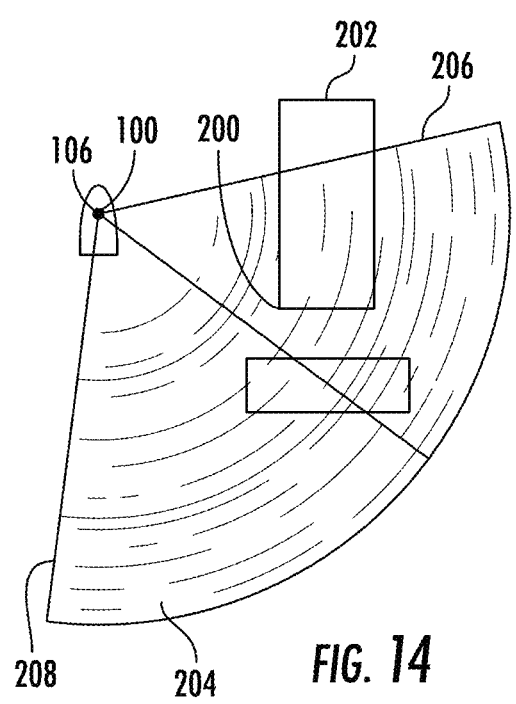

SYSTEM AND METHOD FOR MAINTAINING SONAR IMAGING OF A STRUCTURE REGARDLESS OF BOAT ORIENTATION

CROSS-REFERENCE TO RELATED PATENT APPLICATIONS

This patent application claims the benefit of U.S. Provisional Patent Application No. 63/001,858, filed Mar. 30, 2020, the entire teachings and disclosure of which are incorporated herein by reference thereto.

FIELD OF THE INVENTION

This invention generally relates to consumer fish finders, and more particularly to control of sonar imaging of underwater structures for use in consumer fish finders.

BACKGROUND OF THE INVENTION

Advances in consumer fish finder sonar technology have yielded significant improvements in fish and underwater structure location and imaging. Indeed, MEGA Imaging® available from Humminbird® of Eufaula, Alabama, takes fish finding into the megahertz range of the sonar signal for more detail than has ever been available before. Pioneered by Humminbird®, the clarity of MEGA Imaging® can help an angler easily distinguish fish from structure, see the direction fish are facing and even target individual species. Indeed, with the different types and configurations of equipment, such high quality sonar imaging may provide side imaging, down imaging, and imaging 360 degrees around the angler's boat.

The Side Imaging® products deliver an incredible view to both sides of an angler's boat with extended range out to 200 feet on either side as depicted in FIG. 1. Down Imaging® products are configured to show an angler what is directly below the boat to a depth down to 200 feet in crystal-clear detail as depicted in FIG. 2. The 360 Imaging products sweep up to 125 feet in every direction around an angler's boat to deliver the clearest images ever seen of structure, the bottom and fish, even while the boat is sitting still as depicted in FIG. 3. Such technology allows more accurate casts, more unforgettable moments and more incredible MEGA Imaging® all around thanks to the 360-degree view of the water that is constantly updating with the boat at the center.

This product allows an angler to mark a waypoint directly on a Humminbird® screen at the location of a displayed fish, structure, etc., and will then provide range rings to show the distance from the boat to the target. This allows an angler to line up and cast to where the fish are. Indeed, it is possible to customize the sweep area from 360 degrees down to 10 degrees as depicted in FIG. 4. FIGS. 5-7 depict current products available from the assignee of the present application that provide such 360 degree sonar imaging and can be mounted on a trolling motor shaft or stand alone as desired by the angler.

While the above described advances in sonar technology provides the modern angler with the most realistic imaging of the underwater environment, including imaging of the angler's quarry, some forward-looking and down-looking sonar technology uses a sonar beam that is relatively small (roughly 25 degrees). As such, the sonar array must be constantly manually steered by the angler to keep it facing at the angler's intended target. Indeed, while the customized sweep area of the 360 Imaging product cuts down on that needed manual steering to keep the intended target in frame on the fishfinder display, wind, current, and other forces that move the orientation of the angler's boat soon also require manual steering adjustment to get the target back in frame.

In view of the above, what is needed is a system and method to continually steer a sonar to keep the intended target in frame regardless of movement of the angler's boat while fishing. Embodiments of the present invention provide such systems and methods. These and other advantages of the invention, as well as additional inventive features, will be apparent from the description of the invention provided herein.

BRIEF SUMMARY OF THE INVENTION

In one aspect, embodiments of the present invention provide a system that allow automatic hands and feet free control of the steering of the sonar beam to lock onto an underwater target and continue to keep that target in frame regardless of the movement of the user's boat.

In one example, a sonar target locking system to position a sonar array to maintain the sonar array pointing at an user-set target includes an electro-mechanical assembly, a positioning system and a controller. The electro-mechanical assembly is operable to carry, steerably, the sonar array. The positioning system includes a GPS unit. The positioning system is configured to identify a position of the user-set target and to determine changes in the position of the sonar array relative to the position of the user-set target. The controller uses the position of the user-set target and the changes in the position of the sonar array to control the electro-mechanical assembly to steer the position of the sonar array so that the sonar array remains pointed at the position of the user-set target.

Notably, this prior system does not include the sonar array but is instead a system to which the sonar array can be attached.

The controller may be part of the positioning system and assist in identifying the position of the user-set target and/or determine changes in position of the sonar array.

In one example, the positioning system includes an Inertial Measurement Unit (IMU) that assists in determining changes in the position of the sonar array.

In one example, the IMU includes at least one sensor to sense acceleration, velocity and/or heading of the electro-mechanical assembly and/or an attached sonar array. The IMU may include gyroscopes, speedometers, accelerometers, etc.

In one example, the controller is part of a fish finder control head.

In one example, the sonar array is a sweeping sonar array that electro-mechanically sweeps a predefined area to be imaged. The electro-mechanical assembly operable to carry, steerably, the sonar array performs the electro-mechanical sweeping of the sonar array and the controller controls the signal for performing the electro-mechanical sweeping to maintain the sonar array pointed at the position of the user-set target, even when the sonar array is moving relative to the position of the user-set target.

In one example, the sonar array is a sweeping sonar array that electro-mechanically sweeps a predefined area to be imaged. A single motor electro-mechanically performs the electro-mechanical sweeping as well as steers the sonar array such that the sonar array remains pointed at the position of the user-set target.

In one example, the sonar array is a sweeping sonar array that electro-mechanically sweeps a predefined area to be imaged. The controller controls the electro-mechanical assembly operable to carry, steerably, the sonar array independent of any control of the electro-mechanical sweeping of the sonar array. For example, two separate motors may be used. One motor for sweeping and a second motor for changing position of the sonar array.

In a more particular example, the sonar array is part of a transducer assembly that also includes a first motor. The first motor drives the sonar array to electro-mechanically sweep a predefined area to be imaged. This can include oscillating back and forth within a predefined scanning sector. The electro-mechanical assembly includes a second motor. The electro-mechanical assembly operably carries the transducer assembly. The second motor adjusts the position of the transducer assembly including the sonar array and the first motor to maintain the sonar array pointed at the position of the user-set target.

In one example, the system includes an user input device to activate the controller to control the electro-mechanical assembly to maintain the sonar array pointing at the position of the user-set target.

In one example, the user input device is selected from the group consisting of a button on foot pedal, an input device of a fish finder control head, or a button on a remote. In particular examples, the foot pedal could be for controlling steering of a trolling motor or a separate foot pedal.

In an example, a sonar imaging system includes a sonar target locking system as outlined above. The system also includes a sonar array attached to the electro-mechanical assembly.

In an example, a method of maintaining a sonar array pointed at a user-set target is provided. The method includes identifying a position of a user-set target. The method includes pointing the sonar array at the position of the user-set target. The method includes determining changes in the position of the sonar array relative to the position of the user-set target, with a controller. The method includes maintaining the sonar array pointed at the position of the user-set target by controlling an electro-mechanical assembly carrying the sonar array to adjust a position of the sonar array, with control signals generated by the controller.

In an example, the step of identifying a position of a user-set target includes using a GPS unit.

In an example, the step of determining changes in the position of the sonar array relative to the position of the user-set target, includes using a GPS unit, an Inertial Measurement Unit (IMU) or both a GPS unit and an IMU.

In an example, the method includes sweeping, with a motor of the electro-mechanical assembly carrying the sonar, the sonar array to perform sector scanning within a predefined angle. Sweeping and maintaining the sonar array pointed at the position of the user-set target are performed by the same motor.

In one example, the method includes sweeping, with a first motor, the sonar array to perform sector scanning within a predefined angle. The electro-mechanical assembly that adjusts the position of the sonar array includes a second motor for maintaining the sonar array pointed at the position of the user-set. Maintaining the sonar array pointed at the position of the user-set target includes adjusting a position of the sonar array and the first motor with the second motor.

In one example, identifying the position of the user-set target includes identifying a waypoint using a fish finder control head that includes a GPS unit. The GPS unit of the control head need not be within the housing of the control head but could be remote from the housing of the control head.

In one example, pointing the sonar array at the position of the user-set target is performed by manually controlling the position of the sonar array until the sonar array is pointed at the position of the user set target.

In one example, manually controlling the position of the sonar array includes controlling the position of the sonar array using manual inputs to a foot pedal, manual inputs to a fish finder control head or manual inputs to a remote control.

In one example, the step of identifying the position of the user-set target occurs after the step of pointing the sonar array at the position of the user-set target. This allows a user to view the target, such as on a fish finder control head, and then using the fish finder control head to set a way point or other positioning information on the user-set target.

In one example, the step of identifying the position of the user-set target occurs prior to the step of pointing the sonar array at the position of the user-set target. In this situation, the user could have predefined coordinates of the target or could have a pre-saved waypoint.

In an example, a sonar imaging system for use with a trolling motor includes a sonar array, an electro-mechanical assembly, and a controller. The electro-mechanical assembly steerably carries the sonar array. The electro-mechanical assembly includes a first motor. The first motor is not used to steer the trolling motor. The controller controls the electro-mechanical assembly to steer the position of the sonar array so that the sonar array remains pointed in the same direction as the trolling motor is pointed.

In one example, the controller receives trolling motor direction information indicative of the direction the trolling motor is pointed and uses the trolling motor direction information to control the first motor.

In one example, the controller receives trolling motor steering control signals and the controller uses the trolling motor steering control signals as an input to control the first motor.

In an example, a method of controlling the positioning of a sonar imaging system including a sonar array includes steering a trolling motor. This includes changing the direction of the trolling motor. The method includes steering the sonar array, using an electro-mechanical assembly including a first motor that is not used to steer the trolling motor. Steering of the sonar array is such that the sonar array remains pointing in the same direction as the trolling motor.

In one example, the method includes receiving trolling motor steering control signals and the step of steering the sonar array includes using the trolling motor steering control signals to control the first motor.

In one example, the method includes receiving trolling motor direction information indicative of the direction the trolling motor is pointed. The step of steering the sonar array includes using the trolling motor direction information to control the first motor.

In one embodiment the system utilizes an Inertial Measurement Unit(s) (IMU) in conjunction with GPS technology, a Humminbird Control Head and communication technology, e.g. Ethernet capability, to point the sonar array at an intended target. Preferably, the system will continually steer the array to continue to point towards that target even when the boat is rotating or moving in various motions. In one embodiment, the system will control the orientation of the sonar array via an electro-mechanical assembly that can be steered electrically with a servo motor. In one embodiment the system will control the orientation of the sonar array by adjusting the angular coverage of the 360 degree sonar imaging sector scan function available with the 360 Imaging product.

In one embodiment the sonar transducer steering assembly is connected to the fishfinder control head via Ethernet. In other embodiments, the communication is accomplished via wireless technology.

In one embodiment, the assembly is pointed towards a target using a foot control. Once the target is in frame, the user can then push a button to lock on the structure and the system and method will keep the sonar array pointed in the direction of the target regardless of boat movement and changes in orientation or drift regardless of the cause.

In one embodiment the user can set a waypoint on the head unit of the fishfinder at the structure on which the user wishes to lock the sonar display. The system will then control the direction and orientation of the sonar array to point at that specific waypoint or waypoints regardless of boat movement and changes in orientation or drift regardless of the cause.

In one embodiment the system operates in conjunction with the trolling motor as it automatically positions the boat around a fishing target while steering the transducer to remain locked on its target for hands and foot free fishing.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 12 is schematic illustration of a watercraft including a sonar imaging system according to an example of the disclosure with a desired target out of the scanning area of the transducer assembly of the sonar imaging system;

FIG. 13 is a schematic illustration with the watercraft of FIG. 12 in a same position and orientation relative to the desired target, but with the desired target within the scanning area of the transducer assembly; and FIG. 14 is a schematic illustration with the watercraft of FIGS. 12 and 13 in a different position and orientation relative to the desired target and with the desired target remaining within the scanning area of the transducer assembly.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 8:
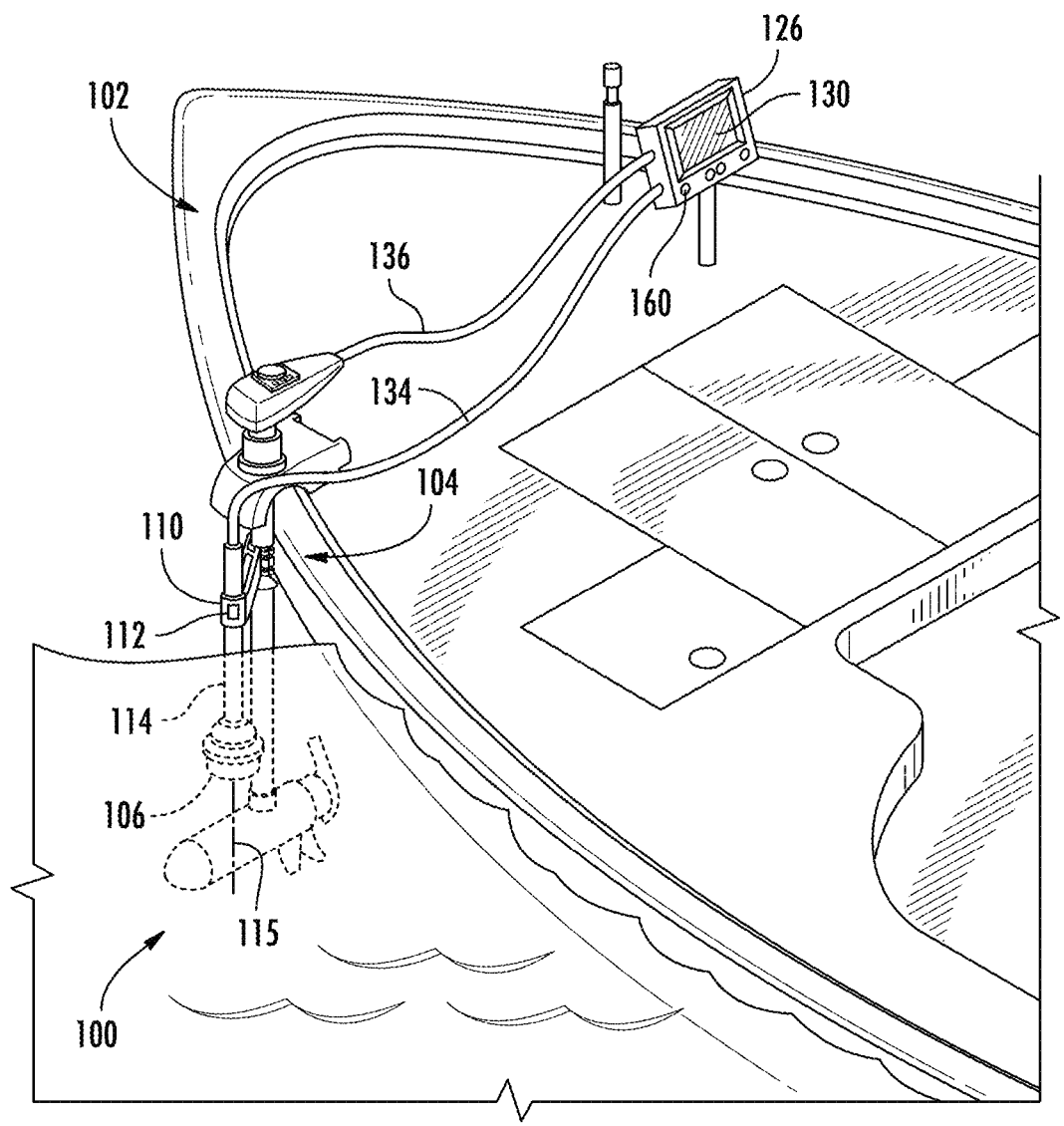
FIG. 8 is an illustration of a watercraft including a sonar imaging system according to an example of the application mounted to a trolling motor.
Figure 9:
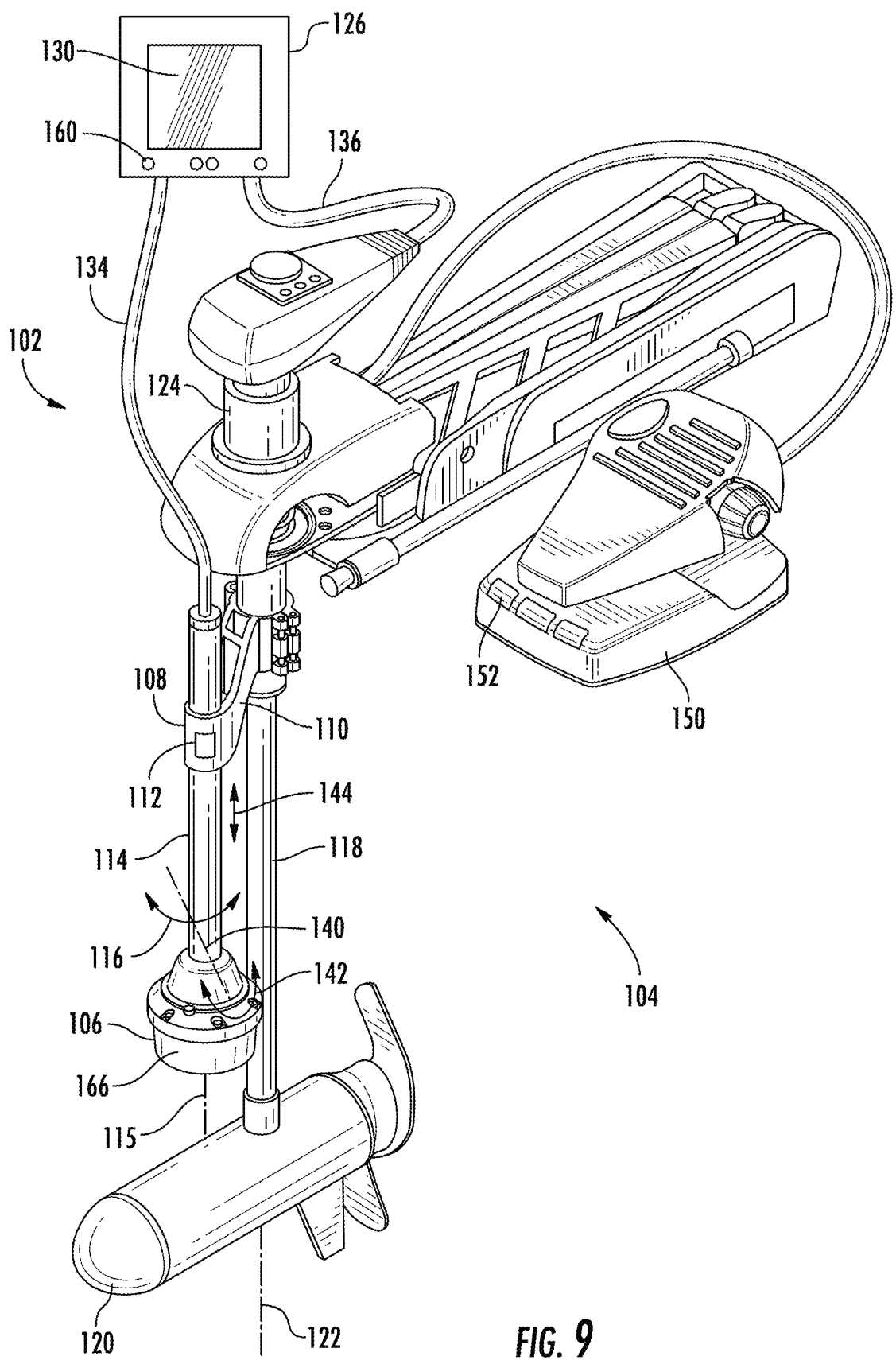
FIG. 9 is an enlarged illustration of the sonar imaging system and trolling motor of FIG. 8.

FIG. 8 illustrates a portion of a watercraft 100 that includes a sonar imaging system 102 according to an example of the present disclosure. FIG. 9 is an enlarged illustration of the sonar imaging system 102 removed from the watercraft 100. In examples, the sonar imaging system 102 is configured to remain pointed at an intended target even when the watercraft 100 is moving relative to the target.

Figure 1:
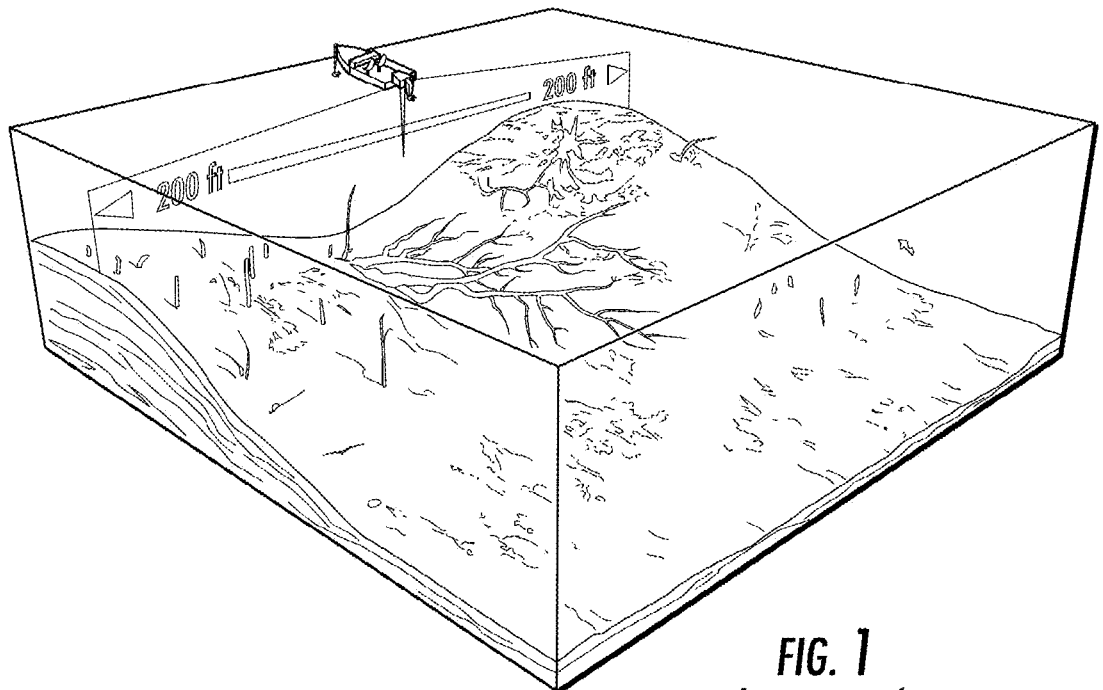
FIG. 1 is a visual depiction of a Side Imaging® sonar system provided by the assignee of the present application.
Figure 2:
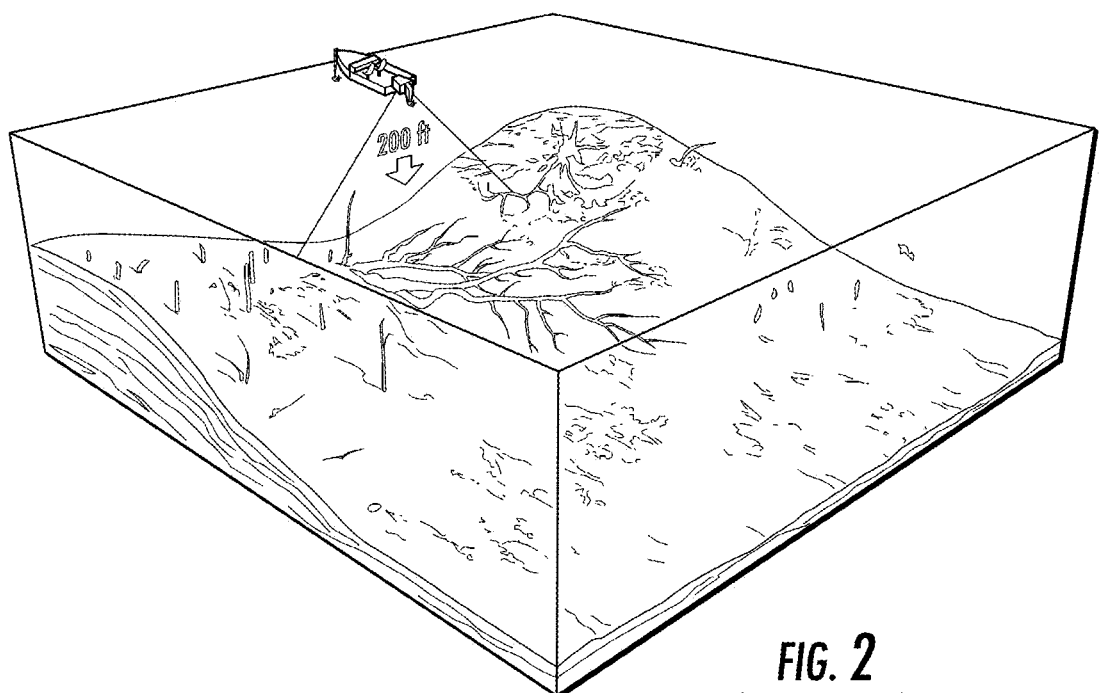
FIG. 2 is a is a visual depiction of a Down Imaging® sonar system provided by the assignee of the present application.
Figure 3:
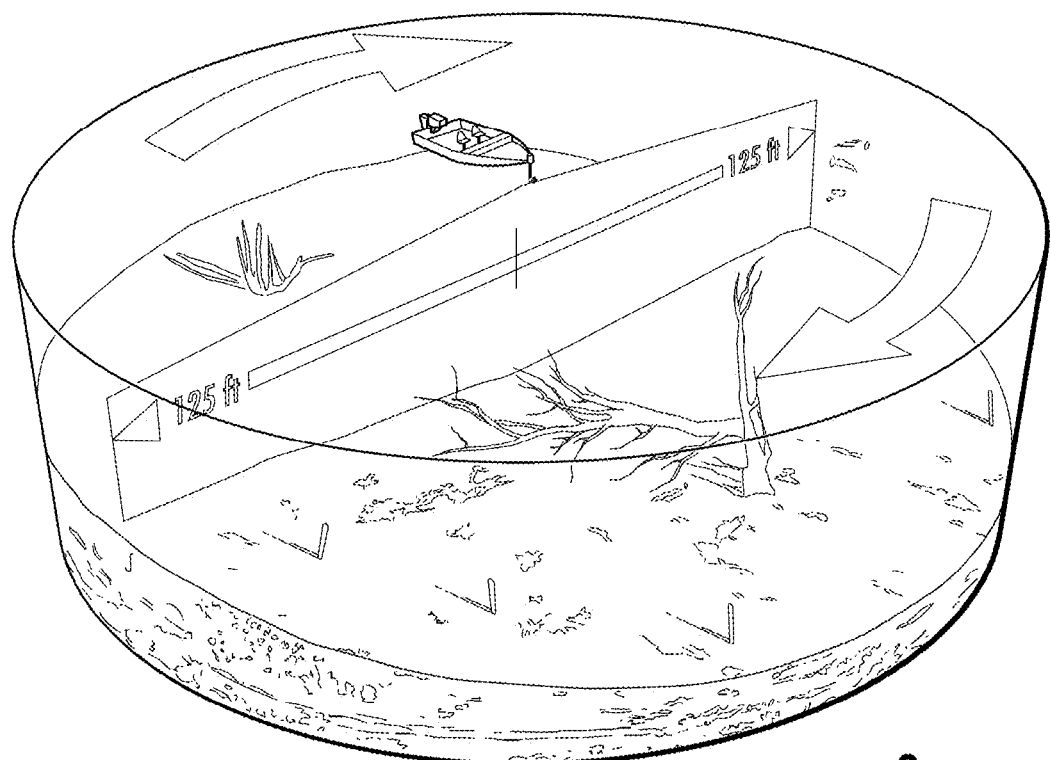
FIG. 3 is a is a visual depiction of a 360 Imaging sonar system provided by the assignee of the present application.
Figure 4:
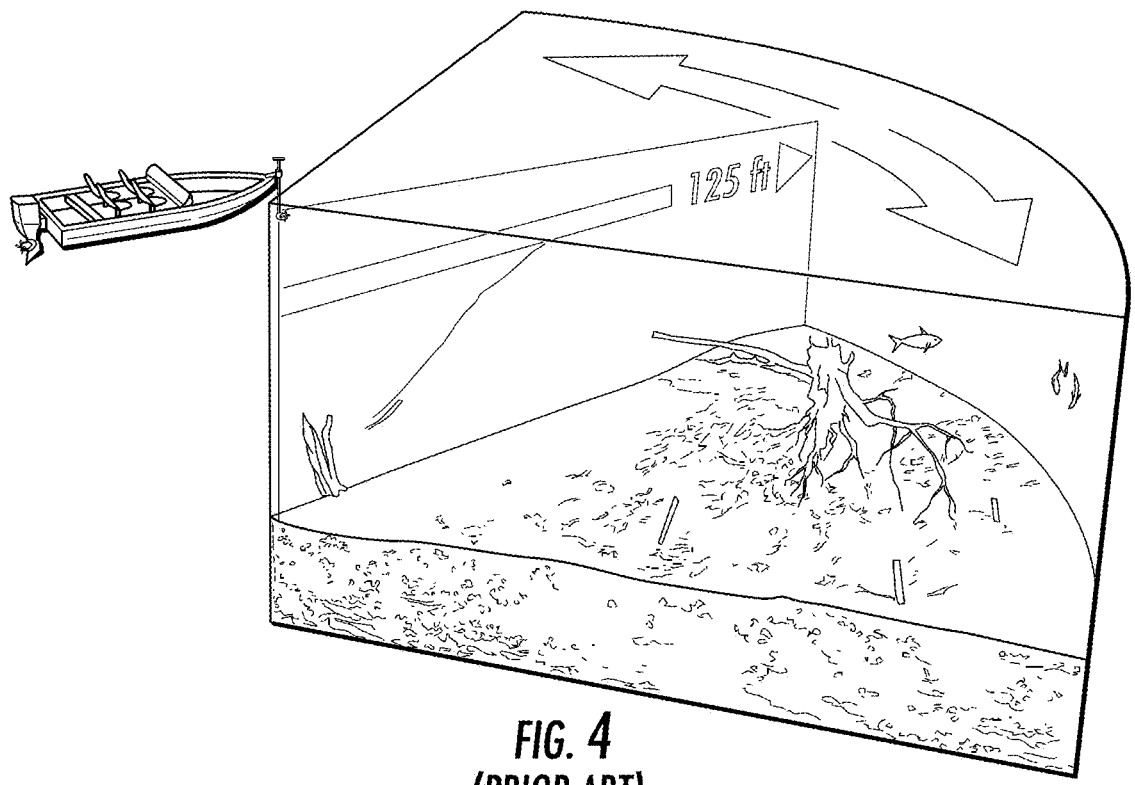
FIG. 4 is a visual depiction of a sector scan feature available with the system of FIG. 3.
Figure 5:
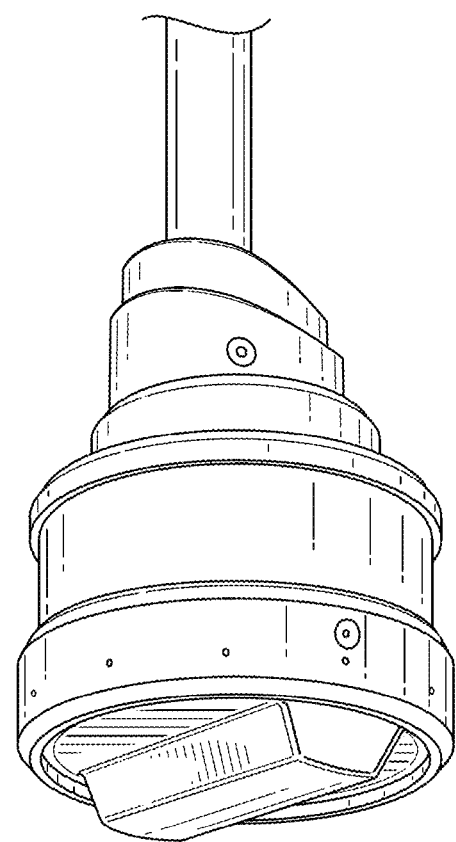
FIG. 5 is an image of a 360 degree sonar transducer assembly of the system of FIG. 3.
Figure 6:
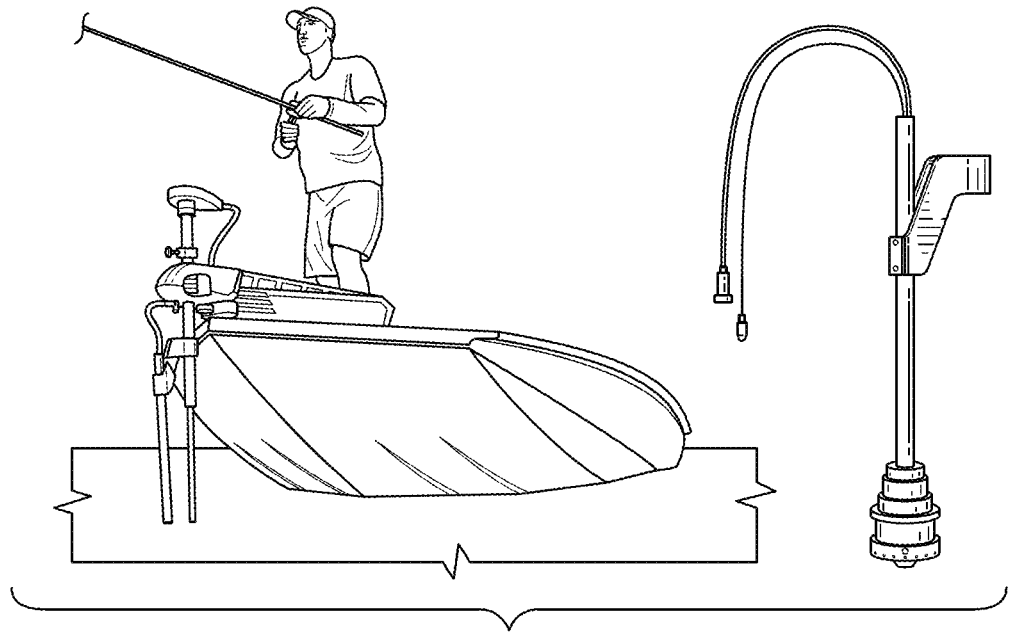
FIG. 6 is an image of a 360 degree sonar product and installation thereof on an user's trolling motor.
Figure 7:
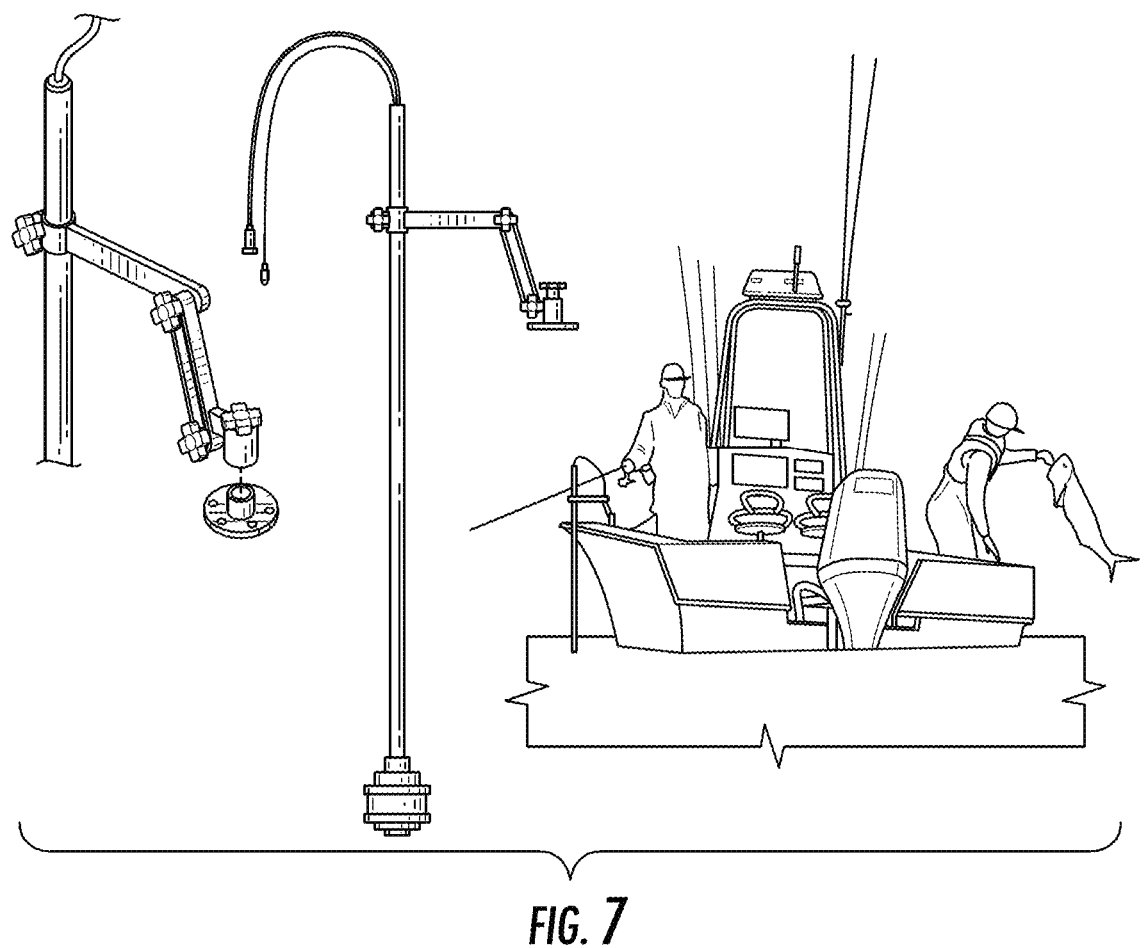
FIG. 7 is an image of a 360 degree sonar product and installation thereof on an user's boat.

In this example, the sonar imaging system 102 is associated with and mounted to a retractable and deployable trolling motor 104. However, other examples can be independent of a trolling motor 104. For example, the sonar imaging system 102 could use a mounting arrangement that mounts to the watercraft 100 independent of the trolling motor and use a mounting arrangement similar to that in FIG. 7.

In this example, the sonar imaging system includes a transducer assembly 106 that includes a sonar array configured for use in generating sonar images of objects under water. The transducer assembly 106 is carried a sonar target locking system of the sonar imaging system 102 that can maintain the transducer assembly 106 pointed at a position of a desired target regardless of the movement of the watercraft due to wind, waves, current, or as a result of controlled steering of the watercraft 100.

In particular, the transducer assembly 106 is an electro-mechanical assembly 108 that carries the transducer 106. The electro-mechanical assembly 108 can be steered electrically to maintain the transducer assembly 106 pointing at a position of a desired target.

The electro-mechanical assembly 108 includes a mount 110 for attachment to the trolling motor 104 (or watercraft 100 in non-trolling motor examples). A motor 112 rotatably drives the transducer assembly 106 so as to adjust the direction the transducer assembly 106 is oriented, e.g. pointed, relative to the watercraft 100. As such, upon movement of the watercraft 100, the transducer assembly 106 controlling of the electro-mechanical assembly can keep the transducer assembly 106 pointing at the position of the desired target.

In this example, motor 112 can rotate shaft 114 about axis 115 as illustrated by arrow 116, which will rotate the entire transducer assembly 106 relative to watercraft 100 and particularly relative to mount 110.

In other examples, the electro-mechanical assembly 108 could be the trolling motor 104. For example, in the trolling motor 104 illustrated in FIG. 9, the trolling motor 104 includes a motor 124 that will electrically rotate shaft 118 and motor 120 about axis 122. In such an example, the transducer assembly 106 could be attached to shaft 118 and the motor 124 and rotational capabilities of the trolling motor 104 could be used to point and orient the transducer assembly 106.

Figure 10:
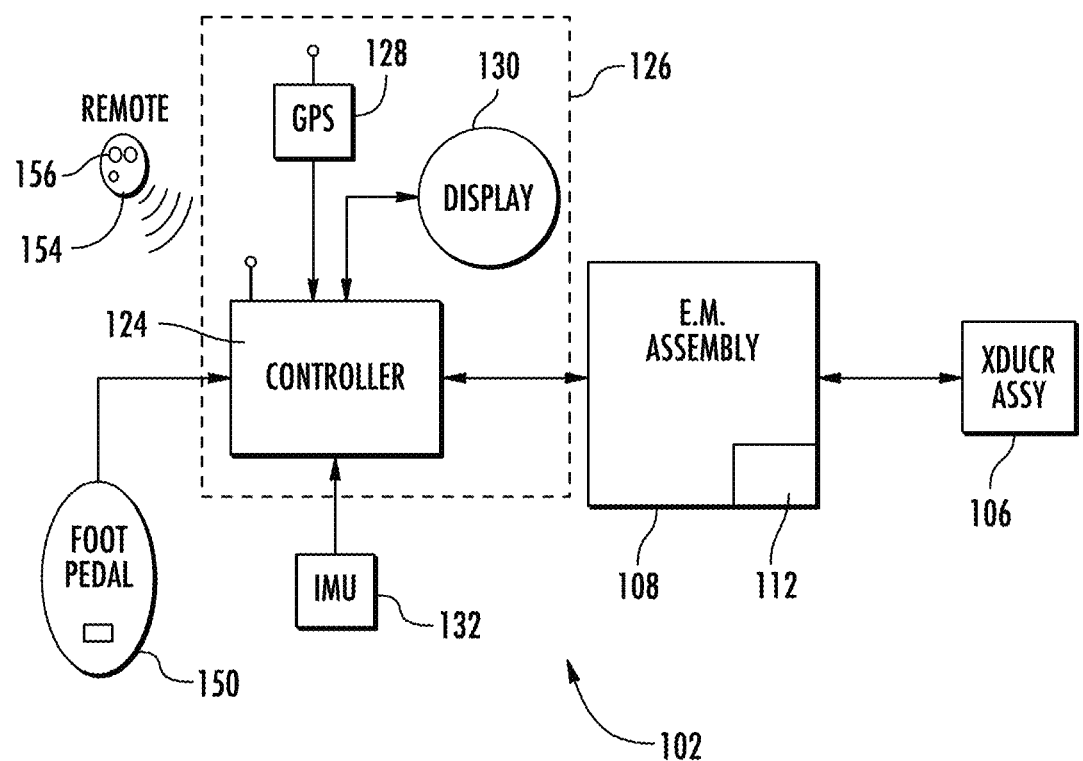
FIG. 10 is a block diagram illustrating elements of an example of the sonar imaging system of FIG. 9.

With additional reference to FIG. 10, an example of the sonar imaging system 102 is illustrated schematically. The sonar imaging system 102 includes a controller 124 operably coupled to the electro-mechanical assembly 108 for controlling motor 112. The controller 124 is operably coupled to the motor 112 to provide control signals to the motor 112 to control motion of the shaft 114 and the aiming of the transducer assembly 106.

In this example, the controller 124 is part of a fish finder control head 126 that also includes a GPS unit 128 and a display 130. An Inertial Measurement Unit 132 (IMU 132) is also connected to the controller 124.

The fish finder control head 126 is illustrated in FIGS. 8 and 9 connected to the electro-mechanical assembly 108 as well as the trolling motor 104 by wires 134, 136. However, in other embodiments, the fish finder control head 126 could be connected to the electro-mechanical assembly 108 and/or the trolling motor 104 wirelessly. In some examples, the fish finder control head 126 need not be connected to the trolling motor 104.

Typically, the fish finder control head 126 will also be operably coupled to the transducer assembly 106 to process the sonar information gathered by the sonar array of the transducer assembly 106. Either of wires 134, 136 could be used to communicate this information or a separate wire could be used for this specific information. Further, this information could be communicated wirelessly. The same controller 124 for controlling motor 112 could be used for processing the sonar information or a separate controller could be used for that processing.

In some examples, wires 134, 136 provide Ethernet communication between the various connected devices. While wires 134, 136 illustrate direct communications, Ethernet boxes or other intervening structure such as other control heads could be incorporated in the system. Further yet, communications can occur using the wiring for transmitting the sonar data between the sonar array and the fish finder control head 126.

As may be seen in FIG. 10, the controller 124 receives inputs from the IMU 132 and the GPS unit 128. The IMU 132 and the GPS unit 128 may be or may be part of a positioning system that can identify a position of an identified target (also referred to herein as the "desired target") and to determine changes in the position of the sonar array relative to the identified target. The controller 124 uses these inputs to control the positioning of the transducer assembly 106 and the corresponding sonar array. In one example, a user would identify the desired target, and then using the GPS inputs and IMU inputs the controller 124 would create control signals to control the electro-mechanical assembly 108 to continue to point the transducer assembly 106 at the desired target as the watercraft 100 and the attached components of the sonar imaging system 102 move relative to the identified target.

The positioning system can include sensors provided by the GPS unit or IMU or separately provided that can provide heading, velocity, acceleration and other information related to the position and motion of the transducer assembly 106. This information is used to determine the changes in position of the transducer assembly 106 so that the controller 124 can properly control the electro-mechanical assembly 108.

In a preferred example, the motor 112 is a servo motor.

While motor 112 adjusts the position of the transducer assembly 106 in one dimension, the electro-mechanical assembly 108 can be configured to position the transducer assembly in two dimensions as well as in three dimensions.

For example, and with reference to FIG. 9, the electro-mechanical assembly 108 can be configured to manipulate the position of the transducer assembly 106 about axis 140 as illustrated by arrow 142 and/or vertically such as along axis 115 as illustrated by arrow 144. It is noted that these are just some potential options for adjustability and other degrees of motion could be incorporated.

The transducer assembly 106 could be pointed towards a target using at least two different methods.

Figure 11:
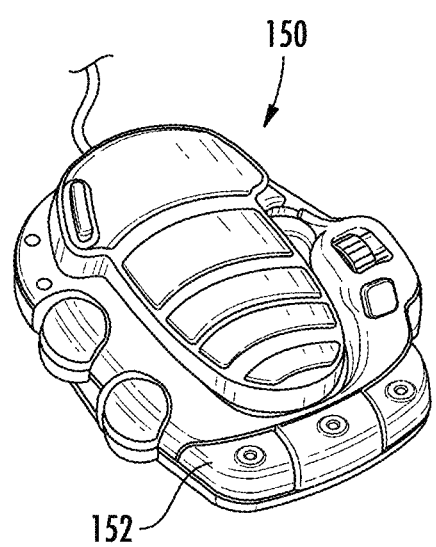
FIG. 11 is an image of a remote foot control for use with an example of the present disclosure.

In a first method, foot control using a foot pedal 150, such as shown in FIG. 9 or 11, is used to steer the transducer assembly 106 to point at the desired target. Once the transducer assembly 106 has been positioned as desired, the user may then press button 152 on the foot pedal 150 or a button 156 on remote 154 (see FIG. 10), telling the sonar imaging system 102 to keep the transducer assembly pointed in the direction of the target. The pressing of the button 152, 156 can be considered a structure lock command.

Notably, foot pedal 150 may be a standalone foot pedal dedicated to the sonar imaging system 102 or could be a foot pedal of the trolling motor 104 as illustrated in FIG. 9. Further, remote 154 could be a standalone remote or incorporated into other remotes used on the watercraft such as a remote that may be used for wirelessly controlling operation of the trolling motor 104 or other components on the boat such as shallow water anchors.

In a second method, the structure lock command is input by the user using the fish finder control head 126. For example, the user could set or otherwise identify a specific waypoint using the fish finder control head 126. In some instances, this could be done using buttons 160 or using touch screen capabilities of the display 130 of the fish finder control head 126.

In one example, this is done by setting a specific waypoint that may be used similar to Spot Lock and i-Pilot features currently employed for trolling motor control of the user's watercraft via a Minn Kota trolling motor.

Embodiments of the present invention provide a system and method that allow an user to mark a waypoint on an underwater target such as a rock, tree, or other under water structure and activate the structure lock command, which will cause the electro-mechanical assembly 108 to automatically point the transducer assembly 106 at this target regardless of the watercraft's movement/direction, drift.

In one example, the sonar imaging system 102 and method work in conjunction with the trolling motor 104 as it automatically positions the watercraft 100 around a fishing target while the transducer assembly 106 remains locked on its target for hands and foot free fishing. More particularly, the trolling motor 104 could be controlled, for example, to traverse back and forth adjacent a target, completely around or partially around a target, such as by way of i-Pilot features, while the transducer assembly 106 is maintained aimed at the desired target using the sonar target lock system.

In one example, the transducer assembly 106 can be a sweeping transducer that is or is similar to the 360 Imaging products outlined above. The sector scan control (e.g. control that causes the sonar array to sweep less than full 360 degrees) of the transducer assembly 106 can be controlled to accomplish the structure lock features. For example, the electro-mechanical assembly of the sweeping transducer that drives the sweeping motion can provide the requisite positioning to maintain the transducer assembly 106 pointed at the target. Here, the as the transducer assembly 106 moves relative to the desired target due to changes in position of the watercraft 100, the control signal controlling the sweeping motion of the transducer assembly is updated accordingly to keep the sweep area focused at the desired target.

As such, maintaining a sonar array pointed at a desired target includes pointing the sector scan area of a sweeping transducer at a desired target, even though the sonar array itself may vary its orientation and pointing relative to the desired target to effectuate the desired sweeping. In a preferred implementation, the identified target would remain proximate the center of the sweep area, but it need not do so in all examples.

In addition to using the actual sector scan control of the transducer assembly 106 of a sweeping transducer, other arrangements could use a separate motor such as motor 112 to simply rotate the entire sweeping transducer. For example, if transducer assembly 106 is a sweeping style transducer that has a motor within the transducer pod 166 thereof, motor 112 could be used to maintain the transducer pod 166 pointed at the target while the motor controlling the sweeping motion of the sonar array of the transducer assembly is controlled under normal sector scan control. This would separate the control of the sweeping motion for the sector scan operation from the control of the positioning of the transducer assembly 106 by motor 112 for the structure lock operation.

Again, communications to control either or both of the sector scan control or the control of motor 112 can occur using Ethernet. In other examples, the communication can occur via wireless communications technology. Further yet, communications can occur using the wiring for transmitting the sonar data between the sonar array and the fish finder control head 126.

With reference to FIGS. 12-14, methods associated with use of a sonar target scan system and corresponding sonar imaging system 102 are described. With initial reference to FIG. 12, user approaches a desired target 200. For example, the user may desire to fish or otherwise scan desired target 200 such as the corner of object 202. In this instance, the transducer assembly 106 is pointed forward of the watercraft 100. This is represented schematically by the scanning area 204 defined between boundary lines 206, 208.

Notably, the desired target 200 is not within the scanning area 204 of the transducer assembly 106. Here, the user can manually manipulate the position of the transducer assembly 106 such that the desired target 200 is within the scanning area 204 of the transducer assembly 106. This could be done by manually generating control signals to control motor 112, such as by way of pressing on foot pedal 150, using the handheld remote 154, or by way of manually inputting control signals into fish finder control head 126 (by way of a touch screen version of display 130 or buttons thereof).

FIG. 13 illustrates the transducer assembly 106 oriented such that it is pointed at the desired target 200. Here, the heading of the watercraft 100 has remained the same as in FIG. 12. As such, the transducer assembly 106 has been rotated approximately 45 degrees counter-clockwise from FIG. 12 to FIG. 13 to locate the desired target 200 within the scanning area 204 of the transducer assembly 106.

Once the desired target 200 is within the scanning area 204, the user can identify the position of the desired target 200. In a preferred method, this is done by way of setting a waypoint on the position of the desired target 200. This can be done using the GPS unit 128 described previously. In some embodiments, this is simply done by pressing a button on the foot pedal 150 or a button on the remote 154 as described previously.

Viewing the desired target 200 with the transducer assembly 106 assists in locking the transducer assembly 106 on the desired target 200, such as by way of setting the waypoint. For example, the user can, typically, view the desired target 200 on the fish finder control head 126 and then use the fish finder control head 126 to identify the position of the desired target 200. Here also, this allows the GPS unit 128 to determine the GPS coordinates of the desired target 200.

Once the structure lock is activated, the sonar imaging system 102, particularly controller 124 thereof, will control the electro-mechanical assembly 108 to reposition the transducer assembly 106 such that the transducer assembly remains pointed at the position of the desired target 200, regardless of the watercraft orientation, drift, or other movement of the watercraft 100 due to wind, waves, current, or as a result of steering control as the watercraft 100 is moved around, toward, or away from the desired target 200. This can be done using inputs from one or both of the GPS unit 128 or the IMU 132, which can be used to determine changes in position of the transducer assembly 106 relative to the position of the desired target 200.

FIG. 14 shows that the heading of the watercraft 100 has changed such that the watercraft 100 is no longer at a same orientation relative to the position of the desired target 200 as in FIGS. 12 and 13. However, the scanning area 204 of the transducer assembly 106 is still pointing at the desired target 202. Here, the system of the present disclosure automatically, and without manual inputs by the user, keeps the desired target 200 within the scanning area 204 of the transducer assembly 106 as the watercraft 100 transitions from the position relative to desired target 200 in FIG. 13 to the position relative to desired target 202 in FIG. 14.

While the prior example used manual inputs to initially locate the desired target 200, other examples can use automatic positioning of the transducer assembly 106 to point the transducer assembly 106 towards the desired target 200. For example, a user could identify the position of the desired target 200 by setting a waypoint using map data on the fish finder control head 126, could identify the position of the desired target 200 by setting a waypoint by directly inputting GPS coordinates into the fish finder control head 126, or could identify the position of the desired target 200 using predefined waypoints previously stored in the fish finder control head 126 that have been recalled from memory of the fish finder control head 126.

Again, once the position is identified, the system will control the electro-mechanical assembly 108 to maintain the transducer assembly 106 pointing at the position of the desired target 200.

As with the sector scanning available with the 360 Imaging, the angular width of the transducer assembly 106 may be varied as desired to focus on one small area or to broaden the imaging to cover the structure and a wider area on either side thereof. The scanning area 204 of FIGS. 12-14 was purely schematic and used for illustrative purposes.

In one implementation of the sonar imaging system 102, the position of the transducer assembly 106 can be controlled such that it always points in the same direction as the trolling motor 104. In this mode, the electro-mechanical assembly 108 is controlled to change the position of the transducer assembly 106 such that it points in the same direction as the trolling motor 104 regardless of the movement, changes in orientation or drift of the watercraft 100.

In such a mode, the foot pedal 150 or other established methods of steering the trolling motor 104 (e.g. remote control or via the fish finder control head 126) that controls the steering of the trolling motor 104 can be used to steer both the trolling motor 104 and the transducer assembly 106 at the same time.

Further, in some examples, the signals that are used to control the steering of the trolling motor 104 are used to generate new signals for controlling motor 112 of the electro-mechanical assembly 108. Alternatively, the controller 124 can use information related to the direction the trolling motor is pointed to generate control signals for controlling motor 112. For example, an encoder or other mechanism can be used to provide direction information for the trolling motor.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A sonar target locking system to position a sonar array to maintain the sonar array pointing at an user-set target comprising:
    an electro-mechanical assembly operable to carry, steerably, the sonar array;
    a positioning system including a GPS unit, the positioning system configured to identify a position of the user-set target and to determine changes in the position of the sonar array relative to the position of the user-set target; and
    a controller configured to use the position of the user-set target and the changes in the position of the sonar array to control the electro-mechanical assembly to steer the position of the sonar array so that the sonar array remains pointed at the position of the user-set target; and
    wherein the sonar array is a sweeping sonar array that electro-mechanically sweeps a predefined area to be imaged, wherein the electro-mechanical assembly operable to carry, steerably, the sonar array performs the electro-mechanical sweeping of the sonar array and the controller controls the signal for performing the electro-mechanical sweeping to maintain the sonar array pointed at the position of the user-set target.

2. The sonar target locking system of claim 1, wherein the positioning system includes an Inertial Measurement Unit (IMU) that assists in determining changes in the position of the sonar array.

3. The sonar target locking system of claim 1, wherein the controller is part of a fish finder control head.

4. A sonar target locking system to position a sonar array to maintain the sonar array pointing at an user-set target comprising:
    an electro-mechanical assembly operable to carry, steerably, the sonar array;
    a positioning system including a GPS unit, the positioning system configured to identify a position of the user-set target and to determine changes in the position of the sonar array relative to the position of the user-set target; and
    a controller configured to use the position of the user-set target and the changes in the position of the sonar array to control the electro-mechanical assembly to steer the position of the sonar array so that the sonar array remains pointed at the position of the user-set target;
    wherein the sonar array is a sweeping sonar array that electro-mechanically sweeps a predefined area to be imaged, wherein a single motor electro-mechanically performs the electro-mechanical sweeping as well as steers the sonar array such that the sonar array remains pointed at the position of the user-set target.

5. A sonar target locking system to position a sonar array to maintain the sonar array pointing at an user-set target comprising:
    an electro-mechanical assembly operable to carry, steerably, the sonar array;
    a positioning system including a GPS unit, the positioning system configured to identify a position of the user-set target and to determine changes in the position of the sonar array relative to the position of the user-set target; and
    a controller configured to use the position of the user-set target and the changes in the position of the sonar array to control the electro-mechanical assembly to steer the position of the sonar array so that the sonar array remains pointed at the position of the user-set target;
    wherein the sonar array is a sweeping sonar array that electro-mechanically sweeps a predefined area to be imaged, the controller controls the electro-mechanical assembly operable to carry, steerably, the sonar array independent of any control of the electro-mechanical sweeping of the sonar array.

6. A sonar target locking system to position a sonar array to maintain the sonar array pointing at an user-set target comprising:
    an electro-mechanical assembly operable to carry, steerably, the sonar array;
    a positioning system including a GPS unit, the positioning system configured to identify a position of the user-set target and to determine changes in the position of the sonar array relative to the position of the user-set target; and a controller configured to use the position of the user-set target and the changes in the position of the sonar array to control the electro-mechanical assembly to steer the position of the sonar array so that the sonar array remains pointed at the position of the user-set target wherein:

the sonar array is part of a transducer assembly that also includes a first motor, the first motor driving the sonar array to electro-mechanically sweep a predefined area to be imaged; and the electro-mechanical assembly includes a second motor, the electro-mechanical assembly operably carries the transducer assembly, the second motor adjusts the position of the transducer assembly including the sonar array and the first motor to maintain the sonar array pointed at the position of the user-set target.

7. The sonar target locking system of claim 1, further comprising a user input device to activate the controller to control the electro-mechanical assembly to maintain the sonar array pointing at the position of the user-set target.

8. The sonar target locking system of claim 7, wherein the user input device is selected from the group consisting of a button on foot pedal, an input device of a fish finder control head, or a button on a remote.

9. A sonar imaging system comprising:
a sonar target locking system of claim 1;
a sonar array attached to the electro-mechanical assembly.

10. A method of maintaining a sonar array pointed at a user-set target, comprising:

identifying a position of a user-set target;

pointing the sonar array at the position of the user-set target;

determining changes in the position of the sonar array relative to the position of the user-set target, with a controller;

maintaining the sonar array pointed at the position of the user-set target by controlling an electro-mechanical assembly carrying the sonar array to adjust a position of the sonar array, with control signals generated by the controller;

sweeping, with a motor of the electro-mechanical assembly carrying the sonar, the sonar array to perform sector scanning within a predefined angle, wherein sweeping and maintaining the sonar array pointed at the position of the user-set target are performed by the same motor.

11. The method of claim 10, wherein the step of identifying a position of a user-set target includes using a GPS unit.

12. The method of claim 10, wherein the step of determining changes in the position of the sonar array relative to the position of the user-set target, includes using a GPS unit, an Inertial Measurement Unit (IMU) or both a GPS unit and an IMU.

13. A method of maintaining a sonar array pointed at a user-set target, comprising:

identifying a position of a user-set target;

pointing the sonar array at the position of the user-set target;

determining changes in the position of the sonar array relative to the position of the user-set target, with a controller;

maintaining the sonar array pointed at the position of the user-set target by controlling an electro-mechanical assembly carrying the sonar array to adjust a position of the sonar array, with control signals generated by the controller;

sweeping, with a first motor, the sonar array to perform sector scanning within a predefined angle; and wherein the electro-mechanical assembly that adjusts the position of the sonar array includes a second motor for maintaining the sonar array pointed at the position of the user-set; and wherein maintaining the sonar array pointed at the position of the user-set target includes adjusting a position of the sonar array and the first motor with the second motor.

14. The method of claim 10, wherein identifying the position of the user-set target includes identifying a waypoint using a fish finder control head that includes a GPS unit.

15. The method of claim 10, wherein pointing the sonar array at the position of the user-set target is performed by manually controlling the position of the sonar array until the sonar array is pointed at the position of the user set target.

16. The method of claim 15, wherein manually controlling the position of the sonar array includes controlling the position of the sonar array using manual inputs to a foot pedal, manual inputs to a fish finder control head or manual inputs to a remote control.

17. The method of claim 10, wherein the step of identifying the position of the user-set target occurs after the step of pointing the sonar array at the position of the user-set target.

18. The method of claim 10, wherein the step of identifying the position of the user-set target occurs prior to the step of pointing the sonar array at the position of the user-set target.

19. A sonar imaging system for use with a trolling motor, the sonar imaging system comprising:

a sonar array;

an electro-mechanical assembly steerably carrying the sonar array, the electro-mechanical assembly including a first motor for steering the sonar array, the first motor is not used to steer the trolling motor;

a controller configured to control the first motor of the electro-mechanical assembly to steer the position of the sonar array so that the sonar array remains pointed in the same direction as the trolling motor is pointed.

20. The sonar imaging system of claim 19, wherein the controller receives trolling motor direction information indicative of the direction the trolling motor is pointed and uses the trolling motor direction information to control the first motor.

21. The sonar imaging system of claim 19, wherein the controller receives trolling motor steering control signals and wherein the controller uses the trolling motor steering control signals as an input to control the first motor.

22. A method of controlling the positioning of a sonar imaging system including a sonar array comprising:

steering a trolling motor including changing the direction of the trolling motor;

steering the sonar array, using a first motor of an electro-mechanical assembly, the first motor is not used to steer the trolling motor, such that the sonar array remains pointing in the same direction as the trolling motor.

23. The method of claim 22, further comprising receiving trolling motor steering control signals and the step of steering the sonar array includes using the trolling motor steering control signals to control the first motor.

24. The method of claim 22, further comprising receiving trolling motor direction information indicative of the direction the trolling motor is pointed, the step of steering the sonar array includes using the trolling motor direction information to control the first motor.

\* \* \* \* \*